June 21, 1949.  G. A. TINNERMAN  2,474,172
FASTENING DEVICE
Filed Nov. 26, 1947

Inventor
GEORGE A. TINNERMAN

H. G. Lombard
Attorney

Patented June 21, 1949

2,474,172

UNITED STATES PATENT OFFICE 2,474,172

FASTENING DEVICE

George A. Tinnerman, Cleveland, Ohio, assignor to Tinnerman Products, Inc., Cleveland, Ohio, a corporation of Ohio Application November 26, 1947, Serial No. 788,113

14 Claims. (Cl. 287—20)

This invention relates in general to improvements in fastening devices and fastening installations for attaching a plate-like article to a rod or shaft member, or conversely, for mounting a rod, tube or shaft member onto a plate or panel member, or the like.

More particularly, this invention deals with an improved clip fastening device and the installation thereof for joining or connecting cooperating rod and plate members in generally normal or other angular relationship and in a manner whereby the parts of the installation are fixedly and rigidly secured against loosening or displacement and otherwise locked in connected relation to each other.

A primary object of the invention is to provide an improved clip fastener and fastening installation of this character in which the joint or connection of the rod and plate members is effected entirely by the improved clip fastener without the use of auxiliary fasteners such as screws, bolts, rivets, threaded bushings or other screw threaded fasteners. The clip fastener of the invention, accordingly, is relatively easily and quickly applied to complete an installation in a minimum of time and effort, thereby providing important savings in mass production methods of assembly.

Another object of the invention is to provide a fastening installation of the kind described and an improved clip fastener which is designed for firm, gripping engagement with a rod or shaft member in cooperation with attaching means on the clip having an interlocked connection with the plate or panel member to secure the rod and plate members together in a fixed and rigid joint against relative rotative as well as relative axial displacement.

A further object of the invention is to provide such a fastening installation in which the improved clip fastener defines an axial bearing for the rod, tube or shaft which adds to the strength of the shaft support and the rigidity of the shaft in the completed installation.

Another object of the invention is to provide a fastening installation of the character aforesaid in which the improved clip fastener comprises an easily manipulated and readily applied type of attaching means for anchoring the clip to the plate or panel member with the rod or shaft firmly and rigidly connected thereto and in a manner which precludes accidental detachment, displacement or loosening of the parts of the installation.

Further objects and advantages of the invention and other new and useful features in the construction, arrangement and general combination of parts will be readily apparent as the following description proceeds with reference to the accompanying drawings, for purposes of illustration but not of limitation, in which like reference characters designate like parts throughout, and in which.

The fastening device of the invention is one of general utility in that it is adapted for a wide range and variety of applications and uses for securing a plate-like article in normal relation to a rod, tube, shaft, or the like, or similarly, for mounting a rod or shaft at right angles or in vertical relation to a panel, plate, or similar member. As an example of one important use, the invention is employed extensively in the construction of radio tuning apparatus to lock a circular disc or plate-like pulley member to the rotary adjusting shaft of the tuning apparatus. Although the present disclosure refers by way of explanation to a joint or connection for such a pulley member, it will be understood that the invention is not in any way limited to such construction but rather, is equally applicable to any similar or related type of joint or connection for securing or uniting various types of cooperating rod and plate members in vertical or generally normal relation to each other.

Figure 6:
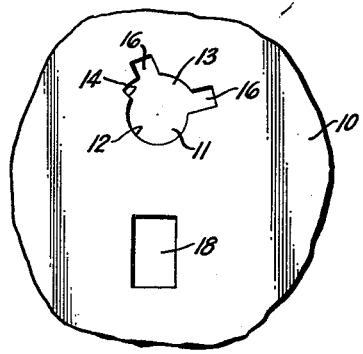
Fig. 6 illustrates a fragment of a plate or panel member as prepared for attachment of the clip fastener thereto.
Figure 5:
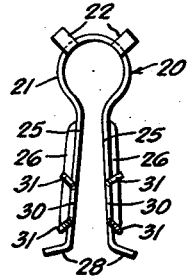
Fig. 5 is a vertical edge elevational view of the improved clip fastener as seen from the rearward edge thereof.
Figure 4:
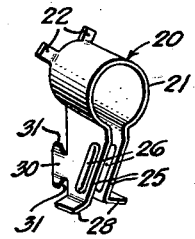
Fig. 4 is a perspective view of the improved clip fastener per se.

Referring now, more particularly, to the drawings, the invention is shown by way of illustration only, as employed to secure a plate-like member 10, such as a pulley or the like, to a rod, tube, spindle, or other type of shaft 1. The shaft or rod may be of round, square or other cross-section and in the present example, is shown comprising a simple round shaft or stem portion such as provided by standard rod stock of circular cross-section. The plate or pulley member 10 may be formed of any suitable metal, wood or plastic material and, as best seen in Fig. 6, is readily provided as a sheet metal stamping, or as a casting having a shaft opening 11 at the center of the pulley or otherwise, at any other selected point on a plate where the shaft or rod 1 is to be attached or is to extend through said plate. The shaft opening 11 comprises a circular shaft receiving recess 12 approximating the size and contour of the shaft at one side of said shaft, and a slightly enlarged arcuate recessed portion 13 at the generally opposite side of said shaft which defines an abutment 14 at the end of said arcuate recess 13. Adjoining said arcuate recess 13 a pair of spaced notches or slots 16 are provided in generally radial relation to the circular shaft recess 12. The overall shaft opening 11 of this character comprising the shaft recess 12 and the arcuate recess 13 is readily provided by a simple punching tool or in the same molding or casting operation for providing the plate or pulley member 10. At the same time, there is provided a slot-like hole 18 in predetermined spaced relation to said shaft opening 11 depending on the size of the clip fastener 20 as determined by the size of the shaft and the thickness of the plate or pulley member to be connected or joined thereto by said clip fastener.

The clip fastener, designated generally 20, is a simple, inexpensive article of manufacture which may be produced at relatively low cost from ordinary standard sheet metal strip stock with little loss or waste of material. The clip fastener may be made from any suitable sheet metal material and preferably of spring steel or cold rolled steel having spring like characteristics, with the thickness thereof selected according to service requirements and the predetermined size of the parts secured. As shown in Figs. 2-5 inclusive, the clip fastener 20 is provided by a simple sheet metal stamping which is bent and formed to define a generall U-shaped device comprising a circular shaped bight or band portion 21 provided with a pair of ears or tongues 22 extending outwardly in generally radial relation thereto and projecting outwardly from the adjacent inner edge thereof a distance equal to or slightly greater than the thickness of the pulley or plate member 10. The projecting ears 22 are provided in angular spaced relation corresponding to the angular spaced relation of the radial notches 16 in the pulley or plate member 10 so as to pass through said notches 16 to a position in which said ears 22 extend slightly beyond the opposite surface of said pulley or plate member 10. Said circular band portion 21 otherwise is provided in accordance with the contour of the shaft 1 and equal to or slightly smaller in size than the cross-sectional area of said shaft in order to grip the same fixedly and rigidly in tightened tensioned engagement therewith.

Said band or yoke portion 21 of the clip fastener is provided intermediate a pair of similar spring legs 25 which are formed from the free end portions of the fastener blank to extend in spaced, diverging relation from said intermediate band portion 21. Preferably said spring legs 25 are formed with longitudinal corrugations 26 projecting outwardly out of the planes thereof to strengthen and reinforce said spring legs to withstand the application of force thereto to tighten and tension the clip in the application thereof to attached position. The extremities of said spring legs 25 preferably are bent outwardly in opposite directions to define feet 28 or projections adapted to bear upon the plate or pulley member 10 to rigidify the clip fastener in attached fastening position.

A locking lug 30 is provided on the inner edge of each of said leg members 25 in a predetermined spacing from the intermediate band portion 21 corresponding substantially to the spacing of the hole 18 from the shaft opening 11 in the plate or pulley member 10. The cooperating lugs 30 preferably are provided in a generally T-shaped design in which the extremities thereof are bent outwardly to form tabs defining shoulders 31 spaced from the adjacent edge of the associated leg member 25 a distance substantially equal to the thickness of the pulley or panel member adjacent the hole 18. Preferably the shoulders 31 thus provided are tapered to define cam shoulders adapted to cam against the adjacent corner edge of the engaged portion of the hole 18 and thereby effect a tight and rigid seating of said cam shoulders 31 in attached position at either edge of said hole 18.

Figure 7:
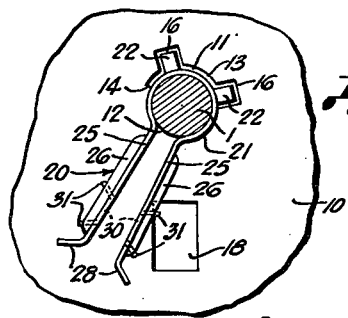
Fig. 7 illustrates the clip fastener in edge elevation as assembled on the rod or shaft, represented in section, and with this assembly shown as initially applied for connection to the plate or panel member.
Figure 8:
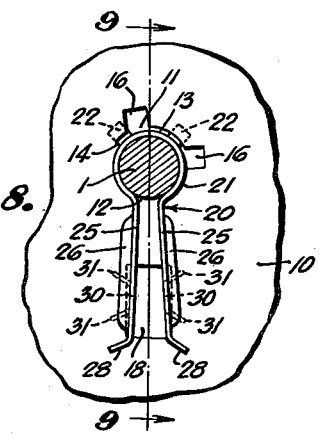
Fig. 8 is a similar view showing the clip fastener in its final applied fastening position securing the rod or shaft member and the cooperating plate or panel member in generally normal relations to each other; and, Fig. 9 is a sectional view of Fig. 8 taken along line 9—9, looking in the direction of the arrows.
Figure 9:
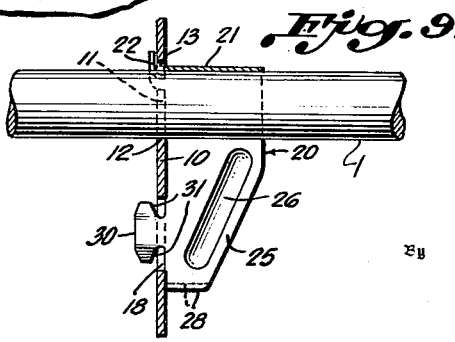

With the clip fastener 20 thus provided, the joint or connection is completed substantially as illustrated in Figs. 7, 8, and 9. The clip fastener is first assembled onto the shaft 1 by sliding the band portion 21 thereof over an end of the shaft or by spreading the leg members 25 of the clip as necessary to slip the shaft into said band portion 21 as shown in Fig. 7. The clip is adjusted axially of the shaft to the selected or predetermined point on the shaft for any particular installation, with the ears or tongues 22 and locking lugs 30 on the inner edges of the spring legs 25 arranged for attachment to the pulley or plate member 10. The clip as thus assembled on the shaft is then applied to the pulley or plate member 10 in the initial position shown in Fig. 7 in a manner whereby the shaft 1 extends through the circular shaft recess 12 in the plate or pulley member 10 and the radially spaced tongues or ears 22 on the clip readily pass through the similarly spaced notches 16 in said plate or pulley member to the opposite side thereof. To this end, the arcuate recessed portion 13 of the shaft opening 11 provides suitable clearance for said tongues or ears 22 adjacent the shaft 1.

The spring legs 25 of the clip are grasped by a suitable tool such as ordinary pliers or by the fingers of the operator and said legs compressed toward each other so that the intermediate band portion 21 of the clip wraps around the shaft 1 in fixed, gripping engagement therewith. Simultaneously the clip and the pulley or plate 10 are moved relatively to each other so that the tongues or ears 22 on the clip are offset and out of register with the notches 16 in the plate or pulley member 10, as illustrated in dotted lines in Fig. 8. The tongue or ear 22 adjacent the abutment 14 engages said abutment, and both tongues 22 otherwise engage adjacent marginal portions of said pulley or plate member 10 on the side opposite which the body of the clip is disposed, as shown in Fig. 9. In the aforesaid relative movement of the clip to this fastening position, the arcuate recessed portion 13 of the shaft opening provides the required clearance for movement of said ears or tongues 22 to their interconnected relation with the plate or pulley member 10, as represented by dotted lines in Fig. 8.

In the relative movement of the clip to position the tongues or ears 21 in such interconnected relation with the plate or pulley member 10, Fig. 8, the locking lugs 30 on the inner edges of the legs 25 are positioned in the area of the hole 18 in said plate or pulley member 10. In this relation, the shoulders 31 on said locking lugs 30 project beyond the edges of said hole 18 in the normal untensioned relation of the legs 25 of the clip, and accordingly, said legs 25 are further compressed as necessary to pass said locking lugs 30 and the shoulders 31 thereon through said hole 18 substantially as shown in Fig. 9.

In this position, the compressive force on the spring legs 25 is removed whereupon said legs spring outwardly to anchor said locking lugs 30 in the hole 18 under continuously effective spring force. In this relation, the flat surfaces of the locking lugs 30 bear firmly against the adjacent straight side edges of the hole 18 while the outwardly projecting cam shoulders 31 carried thereby overlap and engage the adjoining marginal portions of the plate or pulley member 10 bordering said hole 18 on the side opposite which the body of the clip is disposed. The provision of the shoulders 31 in the form of tapered cam surfaces ensures a positive, tight engagement thereof with the marginal edge portions of the hole 18 inasmuch as such cam shoulders are adapted to compensate for slight variations and irregularities of the thickness of said plate or pulley member 10 bordering said hole 18.

The arrangement otherwise is such that when the compressive force on the spring legs 25 is removed, the locking lugs 30 in engagement with the sides of the hole 18 maintain said spring legs 25 in a compressed condition under constant spring tension. This compressed tensioned relation of the spring legs 25 in turn causes the band portion 21 of the clip to clamp the shaft 1 under constant spring tension in a tight frictional and gripping action which prevents any rotative or axial movement of the shaft relative to said band portion 21 of the clip or relative to the plate or pulley member to which the clip is fixedly attached, as aforesaid.

Figure 1:
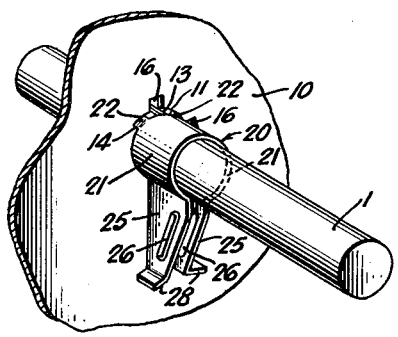
Fig. 1 is a perspective view of an installation comprising a rod or shaft and a plate or panel member connected in generally normal relation to each other by the improved clip fastener of the invention.
Figure 2:
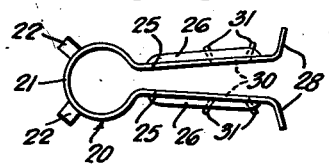
Fig. 2 shows the clip fastener in edge elevation as viewed from the forward edge thereof seen in Fig. 1.
Figure 3:
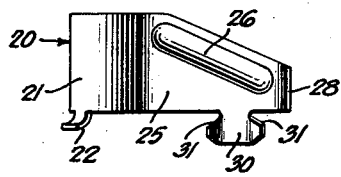
Fig. 3 is a bottom plan view of Fig. 2 showing the clip fastener in side elevation.

In the fully attached position of the clip to complete the joint or connection, as shown in Figs. 1, 8, and 9, the inner straight edges of the spring legs 25 defining the body of the clip bear firmly on the adjacent surface of the plate or pulley member 10 while the outwardly bent feet 28 on the extremities of said spring legs add to the rigidity of the clip in this respect. The tongues or ears 22 and the cam shoulders 31 on the locking lugs 30 engage the opposite side of the plate or pulley member 10 and thereby cooperate with the clip body in retaining the clip firmly and rigidly in attached position against displacement or loosening from said plate or pulley member 10, in either direction axially of the shaft 1. The tongue or ear 22 in engagement with the abutment 14 in the shaft opening in the plate or pulley member 10 and the locking lugs 30 engaging the straight edges of the hole 18 therein cooperate to prevent any lateral displacement or loosening of the clip from attached position. Consequently, the relatively wide band portion 21 in the body of the clip defines a strong and rigid axial bearing for the shaft which effectively supports the shaft and holds the same against lateral displacement while otherwise preventing rotative or axial movement of said shaft relative to the plate or pulley member 10, as aforesaid.

In the event that it is necessary or desirable to disassociate the parts of the joint or connection, as for repair or replacement of a damaged member, the clip fastener 20 is easily and quickly removed simply by compressing the spring legs 25 toward each other as necessary for the shoulders 31 on the locking lugs 30 to lie within the outline of the hole 18 whereupon said locking lugs are readily withdrawn from said hole. The clip is then turned to register the tongues or ears 22 with the notches 16 of the shaft opening 11 and said tongues 22 thereupon passed through said notches to remove the clip from attached relation to the pulley or plate member 10 and otherwise withdraw the shaft member 1 from the shaft recess 12. Thereafter, the clip fastener may be reassembled with the shaft 1 and the plate or pulley member 10 in a repetition of the foregoing described procedure for providing the improved joint or connection of the invention.

The clip fastener preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A clip fastener comprising a metal body bent to define a band and a pair of spaced spring arms extending from said band in the same general direction, a tongue projecting from said band, and a locking lug on a spring arm in spaced relation to said band.

2. A clip fastener comprising a metal body bent to define a band and a pair of spaced spring arms extending from said band in the same general direction, spaced tongues projecting from said band, and locking lugs on said spring arms in spaced relation to said band.

3. In a joint or connection, a shaft, a plate or panel having an opening receiving said shaft and a hole spaced from said opening, and a clip fastener comprising a metal body bent to define a band embracing said shaft and a pair of spring arms extending from said band, and a locking lug on a spring arm in spaced relation to said band and received in said hole to lock the clip fastener in attached position.

4. In a joint or connection, a shaft, a plate or panel having an opening receiving said shaft and a hole spaced from said opening, and a clip fastener comprising a metal body bent to define a band embracing said shaft and a pair of spring arms extending from said band, a tongue on said band extending into the opening receiving the shaft and overlapping the edge of said opening, and a locking lug on a spring arm in spaced relation to said band and received in said hole to lock the clip fastener in attached position.

5. In a joint or connection, a shaft, a plate or panel having an opening including a slot adjacent said shaft and a hole spaced from said opening, and a clip fastener comprising a metal body bent to define a band embracing said shaft and a pair of spring arms extending from said band, a tongue on said band received in said slot in the plate and offset with respect thereto, and a locking lug on a spring arm received in said hole in the plate to lock the clip fastener in attached relation thereto.

6. In a joint or connection, a shaft, a plate or panel having an opening including spaced slots adjacent said shaft and a hole spaced from said opening, and a clip fastener comprising a metal body bent to define a band embracing said shaft and a pair of spring arms extending from said band, spaced tongues on said band received in said spaced slots in the plate and offset with respect thereto, and a locking lug on a spring arm received in said hole in the plate to lock the clip fastener in attached relation thereto.

7. In a joint or connection, a shaft, a plate or panel having an opening including spaced slots adjacent said shaft and a hole spaced from said opening, and a clip fastener comprising a metal body bent to define a band embracing said shaft and a pair of spaced spring arms extending from said band, spaced tongues projecting from the inner edge of said band received in said spaced slots in the plate and offset with respect thereto, and a locking lug on the inner edge of a spring arm received in said hole in the plate to lock the clip fastener in attached relation thereto.

8. In a joint or connection, a shaft, a plate or panel having an opening including spaced slots adjacent said shaft and a hole spaced from said opening, and a clip fastener comprising a metal body bent to define a band embracing said shaft and a pair of spaced spring arms extending from said band, spaced tongues projecting from the inner edge of said band received in said spaced slots in the plate and offset with respect thereto, and cooperating locking lugs on the inner edges of said spring arms received in said hole in the plate to lock the clip fastener in attached relation thereto.

9. In a joint or connection, a shaft, a plate or panel having an opening including spaced slots adjacent said shaft and a hole spaced from said opening, and a clip fastener comprising a metal body bent to define a band embracing said shaft and a pair of spaced spring arms extending from said band, spaced tongues projecting from the inner edge of said band received in said spaced slots in the plate and offset with respect thereto, and a locking lug on the inner edge of a spring arm received in said hole in the plate to lock the clip fastener in attached relation thereto, said locking lug comprising an outwardly bent shoulder engaging the marginal portion of said hole in the plate on the side opposite the spring arm.

10. In a joint or connection, a shaft, a plate or panel having an opening comprising spaced slots adjacent said shaft and a hole spaced from said opening, and a clip fastener comprising a metal body bent to define a band embracing said shaft and a pair of spaced spring arms extending from said band, spaced tongues projecting from the inner edge of said band received in said spaced slots in the plate and offset with respect thereto, and a locking lug on the inner edge of a spring arm received in said hole in the plate to lock the clip fastener in attached relation thereto, said locking lug comprising spaced outwardly bent shoulders engaging marginal portions of said hole in the plate on the side opposite the spring arm.

11. In a joint or connection, a shaft, a plate or panel having an opening including spaced slots adjacent said shaft and a hole spaced from said opening, and a clip fastener comprising a metal body bent to define a band embracing said shaft and a pair of spaced spring arms extending from said band, spaced tongues projecting from the inner edge of said band received in said spaced slots in the plate and offset with respect thereto, and cooperating locking lugs on the inner edges of said spring arms received in said hole in the plate to lock the clip fastener in attached relation thereto, said locking lugs comprising spaced outwardly bent shoulders engaging opposed marginal portions of said hole in the plate on the side opposite said spring arms.

12. In a joint or connection, a shaft, a plate or panel having a shaft opening and a hole spaced therefrom, said shaft opening including an arcuate recess defining an abutment and spaced slots adjacent said recess, and a clip fastener comprising a metal body bent to define a band embracing said shaft and a pair of spaced spring arms extending from said band, spaced tongues projecting from the inner edge of said band received in said spaced slots in the plate and offset with respect thereto with said abutment in the shaft opening in engagement with the adjacent tongue, and a locking lug on the inner edge of a spring arm received in said hole in the plate to lock the clip fastener in attached relation thereto.

13. In a joint or connection, a shaft, a plate or panel having a shaft opening and a hole spaced therefrom, said shaft opening comprising an arcuate recess and spaced slots adjacent said recess, and a clip fastener comprising a metal body bent to define a band embracing said shaft and a pair of spaced spring arms extending from said band, spaced tongues projecting from the inner edge of said band received in said spaced slots in the plate and offset with respect thereto with said abutment in the shaft opening in engagement with the adjacent tongue, and a locking lug on the inner edge of a spring arm received in said hole in the plate to lock the clip fastener in attached relation thereto, said locking lug comprising spaced outwardly bent shoulders engaging marginal portions of said hole in the plate on the side opposite the spring arm.

14. In a joint or connection, a shaft, a plate or panel having a shaft opening and a hole spaced therefrom, said shaft opening comprising an arcuate recess and spaced slots adjacent said recess, and a clip fastener comprising a metal body bent to define a band embracing said shaft and a pair of spaced spring arms extending from said band, said spring arms having outwardly bent extremities and (longitudinal corrugations to stiffen the same), spaced tongues projecting from the inner edge of said band received in said spaced slots in the plate and offset with respect thereto with said abutment in the shaft opening in engagement with the adjacent tongue, and a T-shaped locking lug on the inner edge of a spring arm received in said hole in the plate to lock the clip fastener in attached relation thereto, said locking lug comprising spaced outwardly bent cam shoulders engaging marginal portions of said hole in the plate on the side opposite the spring arm.

GEORGE A. TINNERMAN.

REFERENCES CITED

The following references are of record in the file of this patent:

UNITED STATES PATENTS

| Number | Name | Date |
|---|---|---|
| 1,131,399 | McGenley | Mar. 9, 1915 |
| 2,392,002 | Heyman | Apr. 9, 1946 |